United States Patent
Naji et al.

(10) Patent No.: US 7,419,544 B2
(45) Date of Patent: *Sep. 2, 2008

(54) ADDITIVE FOR DEWATERABLE SLURRY AND SLURRY INCORPORATING SAME

(75) Inventors: Basil Naji, Toongabbie (AU); Milton O'Chee, Sydney (AU)

(73) Assignee: James Hardie International Finance B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/960,150

(22) Filed: Oct. 6, 2004

(65) Prior Publication Data

US 2005/0045067 A1 Mar. 3, 2005

Related U.S. Application Data

(63) Continuation of application No. 10/090,334, filed on Mar. 4, 2002, now abandoned.

(30) Foreign Application Priority Data

| Mar. 2, 2001 | (AU) | PR3474 |
| Mar. 2, 2001 | (AU) | PR3475 |
| Mar. 2, 2001 | (AU) | PR3476 |
| Mar. 2, 2001 | (AU) | PR3477 |
| Mar. 2, 2001 | (AU) | PR3478 |

(51) Int. Cl.
*C04B 18/06* (2006.01)

(52) U.S. Cl. .................. 106/705; 106/DIG. 1

(58) Field of Classification Search ............ 106/705, 106/DIG. 1
See application file for complete search history.

(56) References Cited

U.S. PATENT DOCUMENTS

| 2,987,408 A | 6/1961 | Minnick |
| 3,360,392 A | 12/1967 | Mod et al. |
| 3,501,324 A | 3/1970 | Kubo |
| 3,679,446 A | 7/1972 | Kubo |
| 3,782,985 A | 1/1974 | Gebhardt |
| 3,843,380 A | 10/1974 | Beyn |
| 3,865,779 A | 2/1975 | Oya et al. |
| 3,873,025 A | 3/1975 | Qvarnstrom |
| 3,932,275 A | 1/1976 | Mewes et al. |
| 4,052,220 A | 10/1977 | Turpin, Jr. |
| 4,066,723 A | 1/1978 | King et al. |
| 4,070,199 A | 1/1978 | Downing et al. |
| 4,088,804 A | 5/1978 | Cornwell et al. |
| 4,101,335 A | 7/1978 | Barrable |
| 4,102,697 A | 7/1978 | Fukuba et al. |
| 4,131,480 A * | 12/1978 | McCurrich et al. |
| 4,131,638 A | 12/1978 | Whitaker et al. |
| 4,134,773 A | 1/1979 | Simeonov et al. |
| 4,144,121 A | 3/1979 | Otouma et al. |
| 4,188,231 A | 2/1980 | Valore |
| 4,204,644 A | 5/1980 | Kozuka |
| 4,240,840 A | 12/1980 | Downing et al. |
| 4,250,134 A | 2/1981 | Minnick |
| 4,256,504 A | 3/1981 | Dunstan, Jr. |
| 4,256,584 A | 3/1981 | Lord et al. |
| 4,261,286 A | 4/1981 | Kupfer |
| 4,265,674 A | 5/1981 | Debus et al. |
| 4,268,316 A | 5/1981 | Wills, Jr. |
| 4,328,145 A | 5/1982 | Bobrowski et al. |
| 4,339,289 A | 7/1982 | Lankard |
| 4,344,804 A | 8/1982 | Bijen et al. |
| 4,374,672 A | 2/1983 | Funston et al. |
| 4,379,729 A | 4/1983 | Cross |
| 4,383,960 A | 5/1983 | Delcoigne et al. |
| 4,388,257 A | 6/1983 | Oguri et al. |
| 4,394,175 A | 7/1983 | Cheriton et al. |
| 4,403,006 A | 9/1983 | Bruce et al. |
| 4,411,723 A | 10/1983 | Takeuchi |
| 4,441,944 A | 4/1984 | Massey |
| 4,478,736 A | 10/1984 | Raba et al. |
| 4,495,301 A | 1/1985 | Suter |
| 4,507,154 A | 3/1985 | Burge et al. |
| 4,721,160 A | 1/1988 | Parevaux et al. |
| 4,746,364 A | 5/1988 | Kawai et al. |
| 4,759,802 A | 7/1988 | Ochi et al. |
| 4,767,491 A | 8/1988 | Vittone et al. |
| 4,770,831 A | 9/1988 | Walker |
| 4,772,328 A | 9/1988 | Pfeifer |
| 4,775,505 A | 10/1988 | Kuroda et al. |

(Continued)

FOREIGN PATENT DOCUMENTS

AR 206788 8/1976

(Continued)

OTHER PUBLICATIONS

"Study on particle szie distribution and chemical activity of mechanical activated fly ash", Xu et al., Guisuanyan Tongbao (2003), 22(2), p. 73-76. Abstract only.*

(Continued)

*Primary Examiner*—Paul Marcantoni
(74) *Attorney, Agent, or Firm*—Gardere Wynne Sewell LLP

(57) ABSTRACT

A cementitious slurry comprising fly ash having a predominant particle size of up to about 10 microns, and/or aluminous material having a predominant particle size of up to about 150 microns. The additive acts as a water reduction agent and can replace either wholly or partially a conventional plasticiser.

11 Claims, No Drawings

U.S. PATENT DOCUMENTS

| | | |
|---|---|---|
| 4,816,091 A | 3/1989 | Miller |
| 4,818,595 A | 4/1989 | Ellis |
| 4,840,688 A | 6/1989 | Vogt |
| 4,846,889 A | 7/1989 | Meyer |
| 4,904,503 A | 2/1990 | Hilton et al. |
| 4,915,740 A | 4/1990 | Sakai et al. |
| 4,933,013 A | 6/1990 | Sakai et al. |
| 4,933,031 A | 6/1990 | Blomberg et al. |
| 4,935,060 A | 6/1990 | Dingsoyr |
| 4,946,505 A | 8/1990 | Jungk |
| 4,981,740 A | 1/1991 | Larsen |
| 4,994,113 A | 2/1991 | Helmstetter |
| 5,032,548 A | 7/1991 | Lowe |
| 5,047,086 A | 9/1991 | Hayakawa et al. |
| 5,073,197 A | 12/1991 | Majumdar et al. |
| 5,106,557 A | 4/1992 | Rirsch et al. |
| 5,108,510 A | 4/1992 | Burge et al. |
| 5,108,679 A | 4/1992 | Rirsch et al. |
| 5,154,771 A | 10/1992 | Wada et al. |
| 5,174,821 A | 12/1992 | Matsuoka et al. |
| 5,192,366 A | 3/1993 | Nishioka et al. |
| 5,236,773 A | 8/1993 | Sorathia et al. |
| 5,254,228 A | 10/1993 | Westhyof et al. |
| 5,294,255 A | 3/1994 | Smetana et al. |
| 5,314,119 A | 5/1994 | Watt |
| 5,338,357 A | 8/1994 | Takai et al. |
| 5,342,485 A | 8/1994 | Acmbrust, Jr. |
| 5,346,012 A | 9/1994 | Heathman et al. |
| 5,352,290 A | 10/1994 | Takeshita et al. |
| 5,366,637 A | 11/1994 | Turvac |
| 5,383,521 A | 1/1995 | Onan et al. |
| 5,385,764 A | 1/1995 | Andersen et al. |
| 5,387,283 A | 2/1995 | Kirkpatrick et al. |
| 5,387,626 A | 2/1995 | Bohme-Kovac et al. |
| 5,403,394 A | 4/1995 | Burgand |
| 5,439,518 A * | 8/1995 | Francis et al. ............... 106/705 |
| 5,453,123 A | 9/1995 | Burge et al. |
| 5,453,310 A | 9/1995 | Andersen et al. |
| 5,470,383 A | 11/1995 | Schermann et al. |
| 5,484,480 A | 1/1996 | Styron |
| 5,490,889 A | 2/1996 | Kirkpatrick et al. |
| 5,508,072 A | 4/1996 | Andersen et al. |
| 5,536,310 A * | 7/1996 | Brook et al. ............... 106/708 |
| 5,547,505 A | 8/1996 | Nakatsu et al. |
| 5,556,458 A * | 9/1996 | Brook et al. ............... 106/708 |
| 5,562,832 A | 10/1996 | McOnie et al. |
| 5,580,508 A | 12/1996 | Kobayashi et al. |
| 5,583,079 A | 12/1996 | Golitz et al. |
| 5,658,624 A | 8/1997 | Anderson et al. |
| 5,681,384 A | 10/1997 | Liskowitz et al. |
| 5,693,137 A * | 12/1997 | Styron ........................ 106/706 |
| 5,728,458 A | 3/1998 | Sweeney |
| 5,817,230 A | 10/1998 | Groppo et al. |
| 5,820,668 A * | 10/1998 | Comrie ...................... 106/600 |
| 5,853,475 A | 12/1998 | Liskowitz et al. .......... 106/705 |
| 5,888,322 A | 3/1999 | Holland |
| 5,891,374 A | 4/1999 | Shah et al. |
| 5,900,053 A | 5/1999 | Brothers et al. |
| 5,997,630 A | 12/1999 | Angelskar et al. |
| 5,997,632 A * | 12/1999 | Styron ........................ 106/705 |
| 6,008,275 A * | 12/1999 | Moreau et al. ................ 524/5 |
| 6,030,447 A | 2/2000 | Naji et al. |
| 6,143,069 A | 11/2000 | Brothers et al. |
| 6,204,214 B1 | 3/2001 | Singh et al. |
| 6,325,853 B1 | 12/2001 | Hogan et al. |
| 6,332,921 B1 * | 12/2001 | Brothers et al. ............. 106/692 |
| 6,346,146 B1 * | 2/2002 | Duselis et al. .............. 106/713 |
| 6,375,853 B1 | 4/2002 | Yoon |
| 6,387,175 B1 | 5/2002 | Lynn et al. |
| 6,482,258 B2 * | 11/2002 | Styron ........................ 106/709 |
| 6,485,561 B1 | 11/2002 | Dattel |
| 6,506,248 B1 | 1/2003 | Duselis et al. |
| 6,533,848 B1 * | 3/2003 | Robl et al. ................... 209/166 |
| 6,572,697 B2 | 6/2003 | Gleeson et al. |
| 6,641,658 B1 | 11/2003 | Dubey |
| 6,645,289 B2 | 11/2003 | Sobolev et al. |
| 6,660,077 B2 | 12/2003 | De Buen-Unna et al. |
| 6,676,744 B2 | 1/2004 | Merkley et al. |
| 6,676,745 B2 | 1/2004 | Merkley et al. |
| 6,682,595 B1 | 1/2004 | Barbour |
| 6,692,564 B2 | 2/2004 | Hofmann |
| 6,692,570 B2 | 2/2004 | Cottier et al. |
| 6,749,897 B2 | 6/2004 | Naji et al. |
| 6,777,103 B2 | 8/2004 | Merkley et al. |
| 6,824,605 B2 | 11/2004 | DeBuen Unna et al. |
| 6,872,246 B2 | 3/2005 | Merkley et al. |
| 6,893,751 B2 | 5/2005 | Naji et al. |
| 7,028,436 B2 | 4/2006 | Bezubic, Jr. |
| 2002/0112827 A1 | 8/2002 | Merkley et al. |
| 2002/0192510 A1 | 12/2002 | Naji et al. |
| 2003/0164119 A1 | 9/2003 | Naji et al. |
| 2004/0145078 A1 | 7/2004 | Merkley et al. |
| 2004/0168615 A1 | 9/2004 | Luo |
| 2004/0211342 A1 | 10/2004 | Sprouts et al. |
| 2005/0005821 A1 | 1/2005 | Colombet et al. |
| 2005/0016423 A1 | 1/2005 | Merkley |
| 2005/0126430 A1 | 6/2005 | Lightner |
| 2005/0235883 A1 | 10/2005 | Merkley |
| 2007/0077436 A1 | 4/2007 | Naji et al. |

FOREIGN PATENT DOCUMENTS

| | | |
|---|---|---|
| AR | 206890 | 8/1976 |
| AR | 227376 | 10/1982 |
| AR | 228671 A1 | 3/1983 |
| AU | 515151 | 3/1981 |
| AU | 44948/85 | 6/1986 |
| AU | 0552930 B2 | 6/1986 |
| AU | A/55929/86 | 10/1986 |
| AU | 572111 | 5/1988 |
| AU | 606344 | 4/1989 |
| AU | A 13067/92 | 9/1992 |
| AU | 659400 | 11/1995 |
| AU | 199856266 B2 | 3/1999 |
| CN | 1099089 A | 2/1995 |
| CN | 1160070 * | 9/1997 |
| CN | 1500038 A | 9/1997 |
| CN | 1178202 | 4/1998 |
| CN | 1251358 | 4/2000 |
| DE | 2344773 | 3/1975 |
| DE | 143936 | 9/1980 |
| DE | 3324671 A1 | 1/1985 |
| DE | 3711549 A1 | 10/1987 |
| DE | 3743467 A1 | 7/1989 |
| DE | 4229572 A1 | 3/1993 |
| DE | 19607081 * | 8/1997 |
| EP | 0007585 | 8/1981 |
| EP | 0069095 | 1/1983 |
| EP | 0314242 * | 5/1989 |
| EP | 0327351 | 8/1989 |
| EP | 0328431 | 8/1989 |
| EP | 0376334 | 7/1990 |
| EP | 0619227 B1 | 10/1994 |
| EP | 0725044 A1 | 8/1996 |
| EP | 0678488 | 9/1998 |
| EP | 0619277 B1 | 12/1998 |
| EP | 0846668 B1 | 3/2002 |
| EP | 0846666 B1 | 8/2004 |
| FR | 2512440 | 3/1983 |
| GB | 1265471 | 3/1972 |
| GB | 1490711 | 11/1977 |
| GB | 1514239 | 6/1978 |
| GB | 2106527 A | 4/1983 |
| GB | 2230772 | 10/1990 |

| | | |
|---|---|---|
| GB | 2276875 | 10/1995 |
| HU | 164419 B | 2/1974 |
| HU | 173947 B | 9/1979 |
| HU | 180773 B | 4/1983 |
| HU | 31027 | 4/1984 |
| HU | 200511 B | 6/1990 |
| HU | 209836 B | 6/1994 |
| HU | 0001904 | 11/2000 |
| IT | 1311962 | 3/2002 |
| JP | (750)95319 | 12/1973 |
| JP | 54-25927 | 2/1979 |
| JP | 55095654 | 7/1980 |
| JP | 55130847 | 10/1980 |
| JP | 92-17659 | 2/1981 |
| JP | 56014466 | 2/1981 |
| JP | 57017452 | 1/1982 |
| JP | 57183344 | 11/1982 |
| JP | 58000351 | 1/1983 |
| JP | 58149939 | 9/1983 |
| JP | 59045953 | 3/1984 |
| JP | 59107985 | 6/1984 |
| JP | 59217659 | 12/1984 |
| JP | 60135211 | 7/1985 |
| JP | 60191074 | 9/1985 |
| JP | 88-052740 | 6/1986 |
| JP | 61141656 | 6/1986 |
| JP | 61178462 * | 8/1986 |
| JP | 62036055 | 2/1987 |
| JP | 62036056 B4 | 8/1987 |
| JP | 62235274 | 10/1987 |
| JP | 63008248 | 1/1988 |
| JP | 63248751 | 10/1988 |
| JP | 64-29843 | 1/1989 |
| JP | 64-37478 | 2/1989 |
| JP | 92-052746 | 4/1990 |
| JP | 92-054171 | 4/1990 |
| JP | 02283646 A | 11/1990 |
| JP | 02289456 A2 | 11/1990 |
| JP | 03295843 A | 12/1991 |
| JP | 04002642 A | 1/1992 |
| JP | 04089340 | 3/1992 |
| JP | 04144949 A2 | 5/1992 |
| JP | 4182333 | 6/1992 |
| JP | 5154816 | 6/1993 |
| JP | 5186261 | 7/1993 |
| JP | 06-127992 A | 5/1994 |
| JP | 06-144912 A2 | 5/1994 |
| JP | 62-71371 | 9/1994 |
| JP | 06256053 * | 9/1994 |
| JP | 06258053 | 9/1994 |
| JP | 7187734 | 7/1995 |
| JP | 07187734 * | 7/1995 |
| JP | 867541 | 3/1996 |
| JP | 08073283 A | 3/1996 |
| JP | 09052747 A | 2/1997 |
| JP | 9201561 | 8/1997 |
| JP | 9227200 | 9/1997 |
| JP | 11139859 * | 5/1999 |
| JP | 200302522 | 10/2000 |
| JP | 2001316157 | 11/2001 |
| JP | 2002053361 | 2/2002 |
| JP | 2005034695 * | 2/2005 |
| KR | 9508587 | 8/1995 |
| KR | 2000014685 * | 3/2000 |
| RU | 2157796 | 10/2000 |
| RU | 2161695 | 1/2001 |
| RU | 2167485 | 6/2001 |
| RU | 2168485 | 6/2001 |
| RU | 2243189 * | 12/2004 |
| SU | 411054 | 1/1974 |
| SU | 1571024 | 6/1990 |
| SU | 2243189 | 9/1990 |
| TW | 408089 | 10/2000 |
| WO | WO 86/00291 | 1/1986 |
| WO | WO 92/00251 | 1/1992 |
| WO | WO 96/40598 | 12/1996 |
| WO | WO 97/21640 | 6/1997 |
| WO | WO 97/27152 | 7/1997 |
| WO | WO 99/08885 | 2/1999 |
| WO | WO 00/48960 A1 | 2/2000 |
| WO | WO 00/48960 | 8/2000 |
| WO | WO 0151427 | 7/2001 |
| WO | WO 02/070218 A1 | 9/2002 |
| WO | WO 02/070247 A1 | 9/2002 |
| WO | WO 02/070421 | 9/2002 |

OTHER PUBLICATIONS

U.S. Appl. No. 10/070,218, filed Jul. 19, 2002, Goodwin.
"Hydrated Calcium Silicate Products Other Than Hydraulic Cements," The Chemistry of Cements, edited by H.F.W. Taylor, vol. 2, p. 101-133, Academic Press.
"Autoclaved Lime-Quartz Materials," J.J. Crennan et al., Cement and Concrete Research, vol. 7, pp. 493-502, 1977.
"Autoclaved Calcium Silicate Hydrates, I—Rates of Formation and Molar Composition," S.A. Abo-El-Enein et al., II Cemento Mar. 1990.
"Influence on Quartz particle size on the Chemical & Mechanical Properties of Autoclaved Aerated Concrete," Isu et al., Cement & Concrete R., vol. 25, p. 243, 1995.
"Crystal Shape and Size Controls of Xonotlite," Y. Arai et al., Gypsum and Lime, No. 248, p. 17, 1994.
CRC Handbook of Chemistry & Physics, $62^{nd}$ ed., p. F124.
Aitken, A. & Taylor, H.F.W., "Hydrothermal Reactions in Lime-Quartz Pastes", J. Appl. Chem., 10, 1960, pp. 7-15.
Assarsson, G.O., "Hydrothermal Reactions Between Calcium Hydroxide and Muscovite and Feldspar at 120-220°," J. Phys. Chem., 64, 1060.
Chan, C.F. et al., "Formation of 11 A Tobermorite from Mixtures of Lime and Colloidal Silica with Quartz", Cement and Concrete Research, 1978, pp. 135-138.
Kondo, R., "Kinetic Study on Hydrothermal Reaction Between Lime and Silica," Autoclaves Calcium Silicate Building Products, London, 1965, 92, 1967.
Kondo, R., et al., "Kinetics and Mechanism of Hydrothermal Reaction in Lime-Quartz-Water System," J. Ceram. Soc., Japan, 84, 1976.
Skaggs et al., "Application of rheological modifiers . . . ", Am. Concrete Institute, 1994, pp. 148, 189-207.
Celite Material Safety Data Sheet, revised date Jul. 10, 1992, 1 p.
Kennedy, GC, Fig 1945 from Econ. Geol. 1950, 45(7)652.
Xu, Lingling, et al., "Study on particle size distribution and chemical activity of mechanical activated fly ash," Guisuanyan Tongbao, 2003, 22(s), pp. 73-76.
"Self-leveling elastic waterproofing coating," Shanghai Building Materials, Issue 6, 2000, pp. 5.
"New & Basic Research Approaches to liquid effluent treatment," Gehm, Paper Trade Journal (1958), 142 (No. 16), 40-4, 46.
"Optimization technique for sewage sludge conditioning with polymer and skeleton builders," Benitez et al., Water Research (1994), 28(10), 2067-73 (abstract only).
"Quality and possible use of brown coal fly ash of East Germany" Blankenburg et al., Frieberger Forschungshefter C (1986), C 413, 102-14.
Office Action mailed Mar. 4, 2002 for U.S. Appl. No. 10/090,561.
Office Action mailed May 17, 2007 for U.S. Appl. No. 10/090,299.
Office Action mailed Mar. 18, 2004 for U.S. Appl. No. 10/090,375.
Office mailed Oct. 21, 2003 for U.S. Appl. No. 10/090,560.
Office Action mailed Jun. 20, 2003 for U.S. Appl. No. 10/090,387.
Office Action mailed Sep. 24, 2003 for U.S. Appl. No. 10/090,406.
Office Action mailed Jan. 17, 2007 for U.S. Appl. No. 11/128,778.
Office Action mailed Feb. 26, 2004 for U.S. Appl. No. 10/090,385.
Office Action mailed Mar. 9, 2004 for U.S. Appl. No. 10/090,362.
Office Action mailed Mar. 9, 2004 for U.S. Appl. No. 10/090,338.
Office Action mailed Apr. 6, 2004 for U.S. Appl. No. 10/090,334.
Office Action mailed Oct. 6, 2004 for U.S. Appl. No. 10/960,150.

* cited by examiner

ADDITIVE FOR DEWATERABLE SLURRY AND SLURRY INCORPORATING SAME

RELATED APPLICATIONS AND PRIORITY CLAIM

This application is a continuation of U.S. patent application Ser. No. 10/090,334 filed Mar. 4, 2002 now abandoned, titled "ADDITIVE FOR DEWATERABLE SLURRY AND SLURRY INCORPORATING SAME. This application thereby claims priority from the following Australian provisional patent applications, the full contents of which are hereby incorporated by cross-reference.

| Application No | Title | Date Filed |
| --- | --- | --- |
| PR3474 | A Composite Product | 2 Mar. 2001 |
| PR3475 | Spattering Apparatus | 2 Mar. 2001 |
| PR3476 | Additive for a Dewaterable Slurry | 2 Mar. 2001 |
| PR3477 | A Method and Apparatus for Forming a Laminated Sheet Material by Spattering | 2 Mar. 2001 |
| PR3478 | Coatings for Building Products | 2 Mar. 2001 |

BACKGROUND OF THE INVENTION

1. Field of the Invention

The present invention relates to admixtures for slurries and in particular cementitious slurry compositions.

2. Description of the Related Art

As is well known in the art, most cementitious compositions are laid down or used in a slurry form. Increasing difficulty and expense in obtaining high quality aggregate for use in such cementitious material such as concrete has forced manufacturers to resort to low grade materials such as crushed stone, marine sand and even recycled crushed concrete obtained from demolitions or old structures. This leads to problems with the concrete such as a higher water demand, bleeding (where, as the slurry settles, water migrates to the surface), lower workability and pumpability.

In the past, these problems have been overcome by the addition of certain additives to the cementitious composition. These plasticisers, sometimes known as water reducers, dispersion agents or super plasticisers, act to increase the workability and validity of the slurry for a given quantity of water. Examples include lignosulphonates, naphthalene sulphonate-formaldehyde condensates.

Typically, these water reducers are added at around 0.3% by weight of cement and provide between 8 and 12% reduction in the water cement ratio, depending upon the addition procedure. Additions of up to 1% by cement provide up to 35% reduction in the water to cement ratio. In high performance concrete application, eg ultra high strength concrete, it is common to overdose in plasticiser/water reducer, (or combinations thereof) to obtain further water reduction of up to 50%. However, at such dosage levels detrimental effects are produced, eg setting times increased and compressive strength of a cementitious mixture reduced.

It is an object of the present invention to overcome or ameliorate at least one of the disadvantages of the prior art, or to provide a useful alternative.

SUMMARY OF THE INVENTION

In a broad aspect, the present invention provides an additive for a cementitious slurry comprising of one or both of the following mineral components:

i) fly ash having a predominant particle size of up to about 10 microns, and ii) aluminous material having a predominant particle size of up to about 150 microns.

The applicants have found that use of the small particle size fraction fly ash or large particle size fraction aluminous material acts as an efficient water reducer for cementitious slurries. The applicants have found that addition of a suitable quantity of such a mineral additive indeed provides a substantial reduction in water required to maintain a predetermined viscosity without any of the aforementioned detrimental effects arising from conventional techniques. The aforementioned additive does not significantly increase set times or cause excessive aeration, which can be a major problem with some known admixtures. Further, it inhibits bleeding and improves workability.

In a preferred embodiment, the aforementioned mineral additive can be used in combination with a conventional water reducer/plasticiser to enhance the water reduction capabilities of such a conventional additive.

In a second aspect, the present invention provides a cementitious slurry comprising an hydraulic binder, water, a plasticiser and a mineral additive including one or both of the following components:

i) fly ash having a predominant particle size of up to about 10 microns, ii) aluminous material having a predominant particle size of up to about 150 microns, and the mineral additive being added in a quantity sufficient to provide a water reduction effect.

In a third aspect, the present invention provides a method of reducing the water requirements of a cementitious slurry comprising adding an effective amount of one or both of the following mineral components: i) fly ash having a predominant particle size of up to about 10 microns, and ii) aluminous material having a predominant particle size of up to about 150 microns.

In a fourth aspect, the present invention provides a method of improving the properties of a cementitious slurry comprising adding an effective amount of one or both of the following mineral components: i) fly ash having a predominant particle size of up to about 10 microns, and ii) aluminous material having a predominant particle size of up to about 150 microns.

The reference to water reduction effect relates to the ability of the mineral additive to effectively reduce the quantity of water required to obtain a particular viscosity. As will be clear to persons skilled in the art, for certain applications, a slurry is designed to have a particular predetermined viscosity for flowability, pumpability or application reasons. The mineral additive described above provides excellent water reduction properties for a slurry. As discussed, it can be used on its own to provide water reduction to the slurry or in combination with a conventional plasticiser/water reducer.

When used in combination with an amount of conventional plasticiser/water reducer, it has been found that the aforementioned mineral additive enhances the water reduction properties of the slurry as will be discussed below.

DETAILED DESCRIPTION OF THE PREFERRED EMBODIMENTS

The preferred embodiments of the present invention relate to the use of a mineral additive to manufacture and improve the properties of a cementitious slurry. More preferably, one or both of the following mineral additives may be used: i) fly ash having a predominant particle size of up to about 10 microns, and ii) aluminous material having a predominant particle size of up to about 150 microns.

The fly ash in the mineral additive refers to fly ash with a predominant particle size of up to about 10 microns. As will be clear to persons skilled in the art, fly ash is a solid powder having a chemical composition similar to or the same as the composition of material that is produced during the combustion of powdered coal. The composition typically comprises about 25 to 60% silica, about 10 to 30% $Al_2O_3$, about 5 to 25% $Fe_2O_3$, up to about 20% CaO and up to about 5% MgO.

Fly ash particles are typically spherical and range in diameter from about 1 to 100 microns. It is the smaller size fraction of fly ash particles with a predominant size below about 10 microns that has surprising water reduction properties.

The fly ash preferably makes up about 30-100% based on weight of cement. Preferably, the fly ash is between about 40 and 90% and most preferably about 50 to 70% based on weight of cement.

Larger size fly ash particles have been known in the past to provide a water reduction effect. Smaller size particles, however, have always been considered unsuitable for water reduction for a few reasons. Firstly, it is expected in the art that the smaller the particle size, the more reactive the particle. Fly ash is a reactive pozzalan and accordingly, smaller size fraction fly ash was considered inappropriately reactive to act as a water reducer.

In addition, due to the high specific surface area of the smaller size fraction fly ash, it was expected that this material would in fact increase water demand. The applicants have surprisingly found that the opposite is in fact the case. The smaller size fraction fly ash boosts the water reducing properties of conventional water reduction agents by a substantial extent.

The aluminous material in the mineral additive preferably has a predominant particle size less than about 150 microns. Preferably, the alumina content of aluminous material based on the weight of cement is between about 5 and 30%, preferably about 10 to 25% and most preferably about 15 to 20%.

If a blend of hydrated alumina and fly ash is used in the mineral additive, the ratio of hydrated alumina:fly ash is preferably between about 1:1 to 1:10.

The term "hydraulic or cementitious binder" as used herein, means all inorganic materials which comprise compounds of calcium, aluminum, silicon, oxygen, and/or sulfur which exhibit "hydraulic activity" that is, which set solid and harden in the presence of water. Cements of this type include common Portland cements, fast setting or extra fast setting, sulphate resisting cements, modified cements, alumina cements, high alumina cements, calcium aluminate cements and cements which contain secondary components such as fly ash, slag and the like. The amount of cement present in the composition of the preferred embodiments of the present invention has a lower limit of about 10 weight percent based on the total dry ingredients, preferably about 15 weight percent, more preferably about 20 weight percent, the upper limit of the amount of the cement is about 50 weight percent, preferably about 40 weight percent, more preferably about 30 weight percent.

The cementitious composition may optionally but preferably include at least one filler material, e.g. graded and ungraded aggregate such as washed river gravel, crushed igneous rock or limestone, lightweight aggregate, crushed hard-burnt clay bricks or air-cooled blast furnace slag, sand, calcium carbonate, silica flour, vermiculite, perlite, gypsum, etc.

The amount of filler present in the cementitious composition preferably has a lower limit of about 5 weight percent based on the total dry ingredients, preferably about 10 weight percent, more preferably about 15 weight percent; the upper limit being about 30 weight percent, preferably about 25 weight percent, more preferably about 20 weight percent.

The cementitious composition may optionally contain other additives including: cement plasticising agents such as melamine sulphonate-formaldehyde condensates, naphthalene sulphonate-formaldehyde condensates, naphthalene sulphonates, calcium lignosulphonates, sodium lignosulphonates, saccharose, sodium gluconate, sulphonic acids, carbohydrates, amino carboxylic acids, polyhydroxy carboxylic acids, sulphonated melamine, and the like.

The amount of conventional plasticiser used in the dry cement composition will vary, depending on the fluidising ability of the particular cement plasticiser selected. Generally, the amount of cement plasticiser is preferably in the range of about 0.3 to about 3 wt %, and more preferably about 0.5 to about 2 wt %, based on the weight of the dry cement composition.

Preferred plasticisers include Melment. F-10, a melamine-formaldehyde-sodium bisulphite polymer dispersant, marketed by SKW-Trostberg in the form of a fine white powder. Another suitable plasticiser is Neosyn, a condensed sodium salt of sulphonated naphthalene formaldehyde, available from Hodgson Chemicals.

Thickener may also be used in the cementitious composition including one or more of the polysaccharide rheology modifiers which can be further subdivided into cellulose based materials and derivatives thereof, starch based materials and derivatives thereof, and other polysaccharides.

Suitable cellulose based rheology-modifying agents include, for example, methylhydroxyethylcellulose, hydroxymethylethylcellulose, carboxymethylcellulose, methylcellulose, ethylcellulose, hydroxyethylcellulose, hydroxyethylpropylcellulose, etc. The entire range of suitable rheology modifiers will not be listed here, nevertheless, many other cellulose materials have the same or similar properties as these and are equivalent.

Suitable starch based materials include, for example, amylopectin, amylose, sea-gel, starch acetates, starch hydroxyethyl ethers, ionic starches, long-chain alkylstarches, dextrins, amine starches, phosphate starches, and dialdehyde starches.

Other natural polysaccharide based rheology-modifying agents include, for example, alginic acid, phycocolloids, agar, gum arabic, guar gum, welan gum, locust bean gum, gum karaya, and gum tragacanth.

The thickener addition rate in the cementitious composition may range between 0.0001 and 0.5% based on the weight of the dry cement composition.

Latex addition of at least one latex selected from the group consisting of: an acrylic latex, a styrene latex, and a butadiene latex is also preferred. This component improves adherence, elasticity, stability and impermeability of the cementitious compositions containing it, and also favours formation of flexible films.

The latex may be used in solid amounts of about 0.5 to about 20 wt %, based on the weight of the dry cement composition. Preferably, it is present in an amount of about 1 to about 15 wt %, and more preferably about 10 wt %, based on the weight of the dry cement composition.

The cementitious composition may optionally incorporate as a substitute to the latex emulsion a proportion of a powdered vinyl polymer or other equivalent polymeric material, to enhance the adhesion; resilience and flexural strength; and abrasion resistance of the composition.

The powdered vinyl polymer is preferably polyvinyl acetate or a copolymer of vinyl acetate with another monomer, such as ethylene. A preferred vinyl acetate resin is VINNAPAS LL5044 thermoplastic resin powder, containing a vinyl acetate-ethylene copolymer, available from WACKER.

The powdered vinyl polymer may be used in amounts of about 0.5 to about 20 wt %, based on the weight of the dry cement composition. Preferably, it is present in an amount of about 1 to about 15 wt %, and more preferably about 10 wt %, based on the weight of the dry cement composition.

The cementitious composition may optionally contain about 0-40 wt % of other fillers/additives such as mineral oxides, hydroxides and clays, metal oxides and hydroxides, fire retardants such as magnesite, thickeners, silica fume or amorphous silica, colorants, pigments, water sealing agents, water reducing agents, setting rate modifiers, hardeners, filtering aids, plasticisers, dispersants, foaming agents or flocculating agents, water-proofing agents, density modifiers or other processing aids

EXAMPLES

So that the present invention may be more clearly understood it will now be described by way of example only with reference to the following embodiments.

Example 1

Effect of Water Reducer and Small Size Fraction Fly Ash Addition on % Water Reduction in a Cement: Fly Ash Mixture Three mixes (total weight of solids=1000 gm each) were mixed with water to achieve a mix viscosity of 4-3 seconds cup drainage time. The details of the mixes are shown in Table 1 below.

TABLE 1

| Mix ingredients | Mix 1 weight, gm | Mix 2 weight, gm | Mix 3 weight, gm |
|---|---|---|---|
| Cement | 300 gm | 300 gm | 300 gm |
| Fly ash (large size fraction) | 700 gm | 700 gm | 500 gm |
| Fly ash (small size fraction) | — | — | 200 gm |
| Water reducer (sulphonated naphthalene formaldehyde) | — | 3 gm | 3 gm |
| Styrene Acrylic Latex Emulsion (56% solids) | 60 ml | 60 ml | 60 ml |
| Welan Gum (Kelcocrete) | 0.1 gm | 0.1 gm | 0.1 gm |
| Water | 550 ml | 350 ml | 325 ml |
| Water reduction in mix, % | — | 36% | 41% |
| Viscosity (drainage time in 50 ml cup) | 3 seconds | 3 seconds | 4 seconds |

It can be seen that the addition of 1% water reducer by weight in cement resulted in 36% reduction in mix water. This level of water reduction is, according to literature, about the limit of what can be achieved at such high water reducer dose. Using higher doses would result in excessively delayed setting time and reduction in the compressive strength in cementitious mixes. When part of the large size fraction fly ash was substituted with smaller size fraction (predominant particle size less that 10 microns) in mix 3, further water reduction was achieved, bringing total water reduction to 41%. This result is quite surprising, as the finer fly ash was expected to in fact increase the water demand in the mix due to its high surface area.

Although the water reducing effect of fly ash in cementitious mixes is well documented in literature, the plasticity enhancing effect of the smaller size fraction in an already plasticised cement:fly ash mixture is considered surprising given the universal rule that finer material exhibit larger surface area, leading to an increase in the water demand, needed as mechanical water coating the finer particles.

Example 1 demonstrates a means of enhancing the water reduction effect in plasticised mixes using a mineral additive with a specified size range, namely the small size fraction fly ash, without resorting to overdosing with water reducer. The result is a more durable mix with higher strength and reduced shrinkage.

Example 2

Water Reduction in Plasticised Mixes Substituting Large Size Fraction Fly Ash for Smaller Size Fraction Fly Ash Two mixes (total weight of solids=1000 gm each) were mixed with water to achieve a mix viscosity in the range of 6-10 Poise. The details of the two mixes are shown in Table 2 below.

TABLE 2

| Mix ingredients | Mix 1 weight, gm | Mix 2 weight, gm |
|---|---|---|
| Cement | 300 gm | 300 gm |
| Fly ash (large size fraction) | 400 gm | 250 gm |
| Fly ash (small size fraction) | — | 150 gm |
| Cenospheres | 300 gm | 300 gm |
| Melment 15 (SKW Chemicals) (sulphonated melamine formaldehyde) | 3 gm | 3 gm |
| MC 1834 Acrylic Resin (Rohm & Haas) | 10 ml | 10 ml |
| Water | 400 ml | 325 ml |
| Water reduction | — | 19% |
| Viscosity (Rotothinner) | 6.5 Poise | 8.8 Poise |

It can be seen that Mix 1 which was comprised of cement, fly ash and cenospheres (ceramic hollow spheres) required 400 ml of water to achieve the required viscosity (in the presence of 1% addition of Melment F15 water reducer). The % solids in this case is 71.4%.

Mix 2, however, required only 325 ml of water to achieve a similar flowability. Such water reduction (around 20%) was enabled by substituting part of the larger fly ash particles with a smaller size fraction (minus 10 microns in size, average size=4 microns). The % solids in this case was increased to 75.5%.

Example 3

Water Reduction in Plasticised Mixes—Comparison of Silica to Fly Ash

Two mixes (total weight of solids=1000 gm) were mixed with water to achieve a mix viscosity of 4-3 seconds cup drainage time. The details of the two mixes are shown in Table 3 below.

TABLE 3

| Mix ingredients | Mix 1 weight, gm | Mix 2 weight, gm |
|---|---|---|
| Cement | 300 gm | 300 gm |
| Fly ash (large size fraction) | 500 gm | 500 gm |
| Fly ash (small size fraction) | — | 200 gm |
| Silica | 200 gm | — |
| Water reducer (sulphonated naphthalene formaldehyde) | 3 gm | 3 gm |
| Styrene Acrylic Latex Emulsion (56% solids) | 60 ml | 60 ml |
| Welan Gum (Kelcocrete) | 0.1 gm | 0.1 gm |
| Water | 400 ml | 325 ml |
| Water reduction in plasticised mix | — | 19% |
| Viscosity (drainage time in 50 ml cup) | 4 seconds | 4 seconds |

It can be seen that Mix 1 which was comprised of cement, fly ash and silica required 400 ml of water to achieve the required viscosity (in the presence of 1% water reducer addition). The % solids in this case is 71.4%.

Mix 2, however, required only 325 ml of water to achieve a similar flowability. Such water reduction (around 20%) was enabled by substituting the silica with ultra fine fraction (minus 10 microns in size, average size=4 microns). The % solids in this case was increased to 75.5%.

Example 4

Water Reduction in Plasticised Mixes Incorporating Combination of Hydrated Alumina and Fly Ash In Table 4, the water requirements for two mixes containing 1.0% addition (by weight of cement) of a water reducer, ie sulphonated naphthalene formaldehyde, are compared.

TABLE 4

| Mix ingredients | Weight (Mix 1) without hydrated alumina | Weight (Mix 2) With hydrated alumina |
|---|---|---|
| Cement | 10000 gm | 10000 gm |
| Fly ash (large size fraction) | 16000 gm | 16000 gm |
| Fly ash (small size fraction) | 8000 gm | 8000 gm |
| Calcium Carbonate (Omyacarb Grade 40) | 6000 gm | 4000 gm |
| Hydrated Alumina | — | 2000 gm |
| Water reducer (naphthalene formaldehyde sulphonate) | 100 gm | 100 gm |
| Welan Gum (Kelcocrete) | 3 gm | 3 gm |
| Styrene Acrylic Latex Emulsion (56% solids) | 2000 ml | 2000 ml |
| Water | 16500 ml | 12500 |
| Water reduction in plasticised mix, % | — | 25% |
| Viscosity (drainage time in 50 ml cup) | 3.5 seconds | 3 seconds |

It can be seen that the addition of 2000 gm of hydrated alumina in mix 2 (in substitution of calcium carbonate), resulted in a significant reduction in the water demand, ie from 16500 to 12500 ml, for the same viscosity level.

This level of water reduction (around 25% in an already heavily plasticised mix) is quite unexpected. It is also contrary to conventional water reduction trends presented in cement chemistry literature which suggest that the amount of water reduction ranges generally between 15% to 35%, and that (beyond a particular dosage) further water reduction is not possible (Concrete Admixtures Handbook by, Ramachandran, 2$^{nd}$ edition, page 447).

From the examples outlined above it can be seen that using a mineral additive comprising small size fraction fly ash and/or aluminous materials provide water reduction in non-plasticised cementitious mixes or additional/enhanced water reduction in plasticised cementitious mixes containing a conventional water reducing agent. Such significant increase in water reduction between 20% and 40% will enable production of high performance cementitious mixes (lower shrinkage, higher strength, more durable), without the disadvantages of overdosing with conventional organic water reducers, ie delayed setting time, strength reduction, excessive aeration. etc.

It will be understood that the modifications or variations can be made to the aforementioned embodiments without departing from the spirit or scope of the present invention. In particular, it will be appreciated that the formulations, coatings, additives, methods and composite products of the present invention are suitable or may be adapted for use in conjunction with the methods and apparatus as described in the various priority documents.

What is claimed is:

1. A cementitious slurry comprising:
   cement;
   water;
   a plasticiser;
   a dewatering additive including a component selected from the group consisting of:
   (i) a fly ash having particles with a predominant size up to about 10 microns forming about 30 wt % to 100 wt % based on the weight of said cement in the slurry;
   (ii) aluminous material having particles with a predominant size less than about 150 microns forming about 5-30 wt % based on the weight of said cement in the slurry, wherein the aluminous material is selected from the group consisting of hydrated alumina, partially hydrated alumina and unhydrated alumina; and
   (iii) both the fly ash of (i) and the aluminous material of (ii);
   wherein the components (i), (ii), or (iii) of said dewatering additive are added to provide water reduction, and the amount of said fly ash having said particle sizes is greater than the amount of said cement by weight percentage.

2. The cementitious slurry of claim 1, wherein said fly ash comprises about 25-60% silica, about 10-30% $Al_2O_3$, about 5-25% $Fe_2O_3$, up to about 20% CaO and up to about 5% MgO.

3. The cementitious slurry of claim 1, wherein the ratio of hydrated alumina to said fly ash is between about 1:1 and 1:10.

4. The cementitious slurry of claim 1, wherein said cement is selected from the group consisting of common Portland cements, fast setting or extra fast setting cement, sulphate resisting cements, modified cements, alumina cements, high alumina cements, calcium aluminate cements and cements which contain secondary components.

5. The cementitious stuffy of claim 4, wherein said secondary components are selected from the group consisting of fly ash and slag.

6. The cementitious stuffy of claim 1, wherein said cement is between about 10 and 50 wt % of total dry ingredients.

7. The cementitious slurry of claim 1, wherein the amount of said plasticiser is between about 0.3 to 3 wt % based on weight of the dry cement.

8. The cementitious slurry of claim 1, wherein said cementitious slurry contains about 5 to 30 wt % of fillers.

9. A cementitious slurry comprising:
a hydraulic binder for cement;
water;
a water reducer selected from the group consisting of:
  (i) fly ash having particle sizes up to about 10 microns;
  (ii) an aluminous material selected from the group consisting of hydrated alumina, partially hydrated alumina, unhydrated alumina and mixtures thereof;
wherein said water reducer reduces by about 20%-40% the amount of water required in the slurry to achieve substantially the same slurry viscosity as a cementitious slurry of an equivalent formulation substantially identical in composition to the formulation of the cementitious slurry but without said water reducer.

10. The cementitious slurry of claim 9, wherein said aluminous material comprises a plurality of particles having size up to about 150 microns.

11. The cementitious slurry of claim 9, further comprising a plasticiser.

* * * * *